(12) United States Patent
Corrigan et al.

(10) Patent No.: US 6,219,840 B1
(45) Date of Patent: *Apr. 17, 2001

(54) METHOD FOR ASSIGNING COMMUNICATION RESOURCES IN A COMMUNICATION SYSTEM

(75) Inventors: Richard J. Corrigan, La Grange; Alan Lee Grau, Bloomingdale; Kurt Steinbrenner, Bartlett; Srinivasan Anand, Palatine, all of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,499

(22) Filed: Mar. 29, 1996

(51) Int. Cl.[7] .............................. H04N 7/173; H04N 7/18
(52) U.S. Cl. .............................. 725/117; 725/74; 725/96
(58) Field of Search ...................... 370/247, 263, 370/264, 265, 321, 335, 337, 342, 343, 344, 347, 436, 437, 442, 441, 458, 459, 463, 465, 468, 477, 478, 479, 480, 489; 348/15–17, 6–14; 455/3.1, 6.1, 6.2, 509, 512, 513, 450–455, 62; 375/240; 709/217–219, 104–105

(56) References Cited

U.S. PATENT DOCUMENTS

| | | | | |
|---|---|---|---|---|
| 5,142,532 | * | 8/1992 | Adams | 370/94.1 |
| 5,218,630 | * | 6/1993 | Patsiokas et al. | 379/59 |
| 5,280,630 | * | 1/1994 | Wang | 455/56.1 |
| 5,400,322 | * | 5/1995 | Hunt et al. | 370/19 |
| 5,479,447 | * | 12/1995 | Chow et al. | 375/260 |
| 5,581,555 | * | 12/1996 | Dubberly et al. | 370/487 |
| 5,675,732 | * | 10/1997 | Majeti et al. | |
| 5,862,451 | * | 1/1999 | Grau et al. | 455/4.1 |

OTHER PUBLICATIONS

U.S. Patent Application 08/589,842, entitled "Channel Quality Management in a Cable Telephony System" filed Jan. 22, 1996, by Alan Grau et. al.

* cited by examiner

Primary Examiner—John W. Miller
(74) Attorney, Agent, or Firm—Joaneen N. Pappas; Romi N. Bose

(57) ABSTRACT

A method for assigning communication resources includes assigning communication resources (216, 218, 220) in the nature of bandwidth according to various selection schemes based upon the type of communication service being provided, and based upon the nature of the service area (128, 130) and subscriber premises (132, 134).

6 Claims, 7 Drawing Sheets

METHOD FOR ASSIGNING COMMUNICATION RESOURCES IN A COMMUNICATION SYSTEM

BACKGROUND

The present invention relates generally to communication systems, and more particularly to assigning communication resources in a communication system.

Communication systems are continually becoming more sophisticated and complex. For example, as broadband communication services evolve, such as broadband systems employing Hybrid Fiber Coax (HFC), a great variety of services are anticipated to be offered, and a great variety of different sorts of subscribers are anticipated to be serviced. For example, a broadband communication system utilizing HFC may offer Plain Old Telephone Service (POTS), computer data transmission, along with video conferencing services, among others. With respect to the subscribers served, in some cases subscribers will tend to be single-family homes, while in other cases subscribers will tend to be sophisticated businesses or multi-subscriber facilities such as apartment buildings, multi-tenant commercial facilities and the like.

The great variety of services anticipated combined with the great variety of types and natures of subscribers introduces a particular challenge for design and operation of the communication systems. More specifically, it is clear that demand on the transmission capabilities of the communications system will vary greatly depending on the particular type of service being used (e.g. video conferences versus POTS) and the nature of the subscriber (e.g. single home versus multi-tenant or business establishment).

More specifically, the challenge presented is to efficiently and effectively allocate communication resources, for example Time Division Multiple Access (TDMA) channels, or any other construct correlating to band width, depending upon the demands of the particular service being used and/or the nature of the subscriber.

Consequently, what is needed is a method and associate apparatus for efficiently managing communication resources for users and services with varying quality and bandwidth requirements.

DETAILED DESCRIPTION OF THE DRAWINGS

Figure 1:
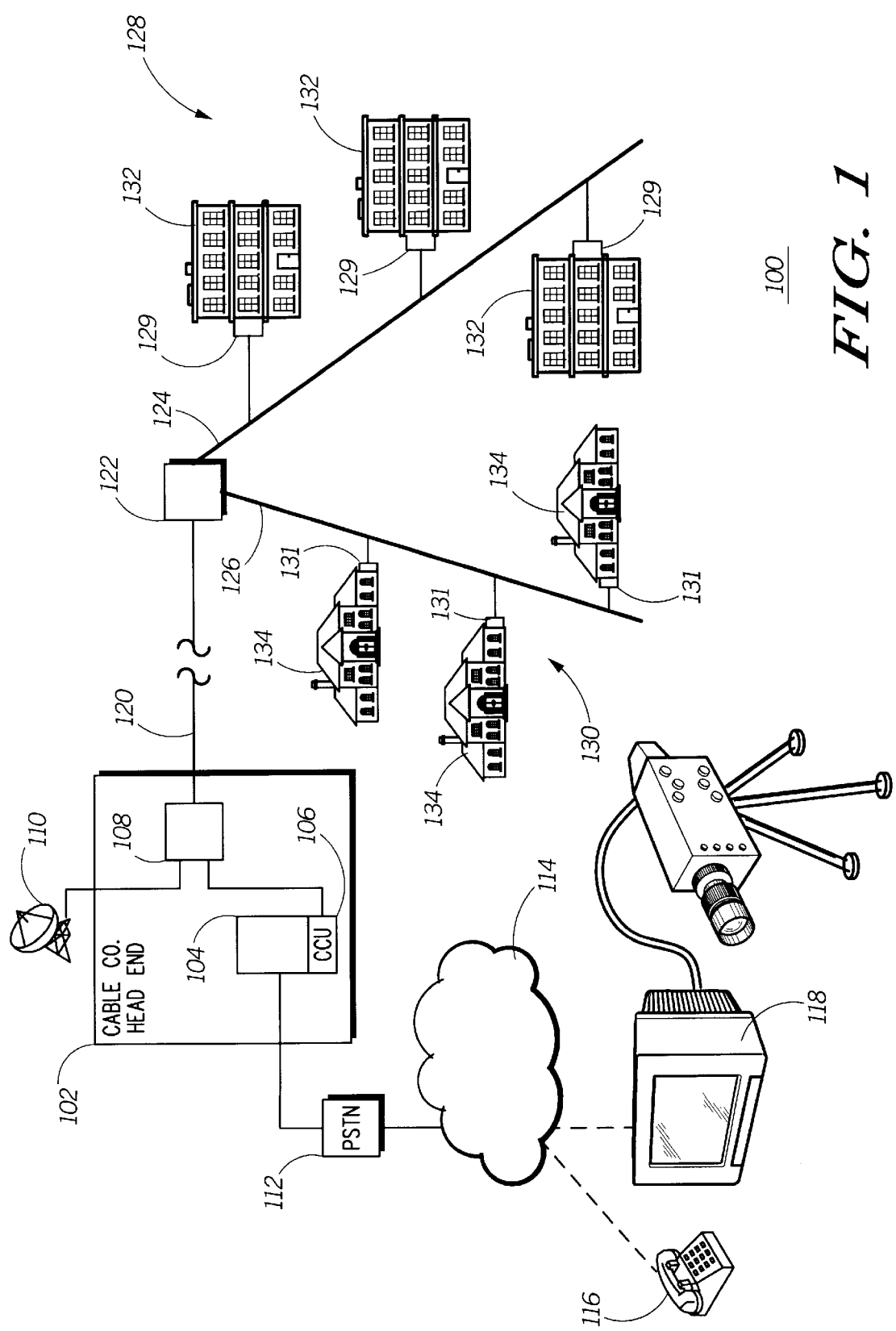
FIG. 1 is a schematic representation of an HFC communication system.

Generally, the preferred system which uses the method and apparatus of the present invention comprises an HFC broadband communication systems where a variety of service are available such as POTS, video conferencing, and bandwidth on demand data services. Additionally, the preferred system includes servicing subscriber premises which vary widely in nature. For example, some subscriber premises will be single-family homes which tend to have certain service types and volume demands, while other subscriber premises will tend to be business or multi-tenant facilities having a larger variety of services and volume demands. Additionally, the preferred communication system utilizes a predetermined number of radio frequency (RF) carriers for transmitting digital information which facilitates the various communication services. In the preferred system the predetermined number of radio frequency carriers each comprise eight Time Division Multiple Access (TDMA) channels. Consequently, the resources available for transmitting data which facilitates the provision of the various services constitute eight TDMA channels multiplied by the predetermined number of RF carriers available. The preferred communication system is further capable of breaking up the individual TDMA channels into subrate portions of a TDMA channels.

Additionally, a preferred communication system includes multiple transceiver which make up a cable control unit (CCU) at the cable company head end and single transceiver at each of their respective subscriber premises. It will be recognized, therefore, that a subscriber premises can receive information associated with the various communication services on a single RF carrier and transmit information associated with the various communication services on only that single RF carrier. Consequently, it is advantageous for the communication system to intelligently allocate and assign communication resources including TDMA channels and subrates of TDMA channels in an effort to optimally utilize the communication resources available. For example, it would be relatively ineffective for the communication system to allocate TDMA channels on the same RF carrier to two neighboring multi-tenant/high service demand subscriber premises. This is because each of those subscriber premises would then necessarily be tuned to the same RF carrier and at that point need to share the eight TDMA channels between the two premises. Rather, it would be preferable, in the service area where there tend to be multi-tenant/high demand subscriber premises, to allocate each of those subscriber premises a TDMA channel on a different RF carrier so that each subscriber premises would have all eight of the TDMA channels of its respective RF carrier available.

The most effective allocation and assigning of communication resources in a different sort of service area, for example, one where each subscriber premise merely contains a single POTS, is dramatically different. With respect to such a service area, it is quite acceptable to pack a single RF carrier with calls to different neighboring homes because it is understood that the homes will need no other TDMA channels. Consequently, a particularly effective approach for such a service area is to pack the highest quality RF carrier with service demands before moving to the next highest quality RF carrier. This scheme has the advantages of utilizing the highest quality carriers and conserving transceiver resources at the head end.

The foregoing provides an overview of the preferred communication system as well as examples illustrating the issues involved with effectively allocating communication resources in a broadband communication system. Following is presented, in connection with the FIGs., a detailed description of the preferred communication system and particular methods for assigning communication resources which are consistent with the present invention.

Turning to FIG. 1, FIG. 1 is a schematic diagram providing an overview of the preferred communication system which uses communication resources assigning methods according to the present invention. More specifically, FIG. 1 shows communication system 100. Communication system 100 is an HFC based broadband communication system. Communication system 100 includes headend 102. As illustrated, headend 102 is a cable company headend facility. At headend 102 is infrastructure equipment 104. Infrastructure equipment 104 is a rack of equipment which facilitates providing telephony services over the cable company's HFC network. The telephony services include, but are not limited to POTS, video conferencing as well as bandwidth on demand data.

Infrastructure equipment 104 includes Cable Control Unit (CCU), also referred to as control unit, 106. Control unit 106 is described in more detail below. Generally it comprises software and hardware including transceivers, to facilitate the telephony services over the HFC network. Also at headend 102 is combiner 108. Combiner 108 serves to combine the telephony related signals from infrastructure equipment 104 with video programming signals captured by antenna 110. Combiner 108 thereby outputs the broadband signal to be distributed throughout the HFC network.

Infrastructure equipment 104 is coupled to a Public Switched Telephone Network (PSTN) 112. PSTN 112 couples to the rest of the telephony and data "universe" represented by extending telephony and data system 114. Two different service originating terminals 116 and 118 are coupled to extending telephony and data system 114. Originating terminals 116 and 118 represent two of the vast number of service originating terminals associated with the extending telephony and data network 114. Originating terminal 116 comprises POTS, while originating terminal 118 comprises a video conference terminal.

A fiber 120 extends toward the cable company's HFC service areas. In connection with a particular service area/neighborhood/node, fiber 120 terminates at fiber node 122. Fiber node 122 converts optical signals carried by optical fiber 120 to electrical signals which are then distributed via coax cables 124 and 126 to service areas 128 and 130 respectively.

Service areas 128 and 130 differ dramatically in character. More specifically, each subscriber premises 132 of service area 128 comprises multi-tenant facility such as a business, office building, or apartment building. In contrast, the subscriber premises 134 of service area 130 each comprise one single-family home. As will be discussed in more detail below, the different nature of the service areas 128 and 130 presents different issues with respect to optimally or at least preferably allocating communication resources.

Figure 2:
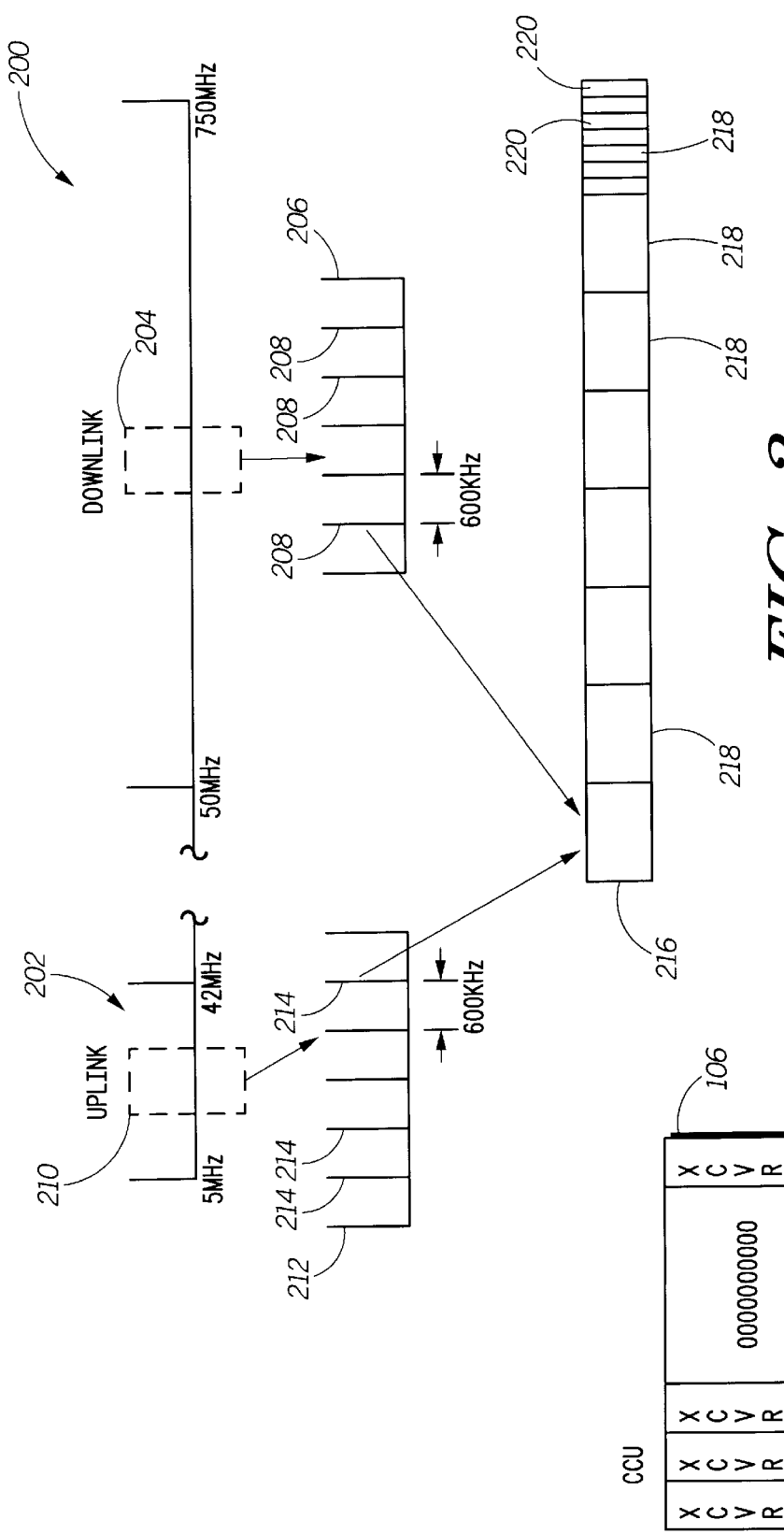
FIG. 2 is a diagram illustrating how the system of FIG. 1 uses the radio frequency spectrum for communications.

Turning now to FIG. 2, FIG. 2 diagramatically illustrates how the communication system shown in FIG. 1 utilizes the RF spectrum for communications. More specifically, portion of the RF spectrum 200 is used for downlink, that is for communications originating at the cable company headend 102 and terminating at a subscriber premises. RF spectrum portion 200 extends from MHz 50 to 750 MHz as shown.

Additionally, communication system 100 utilizes an RF spectrum portion 202 for uplink communications, uplink being communications originating from subscriber premises and terminating at headend 102. RF spectrum portion 202 extends from 5 MHz to 42 MHz.

With respect to downlink RF spectrum portion 200, the preferred communication system will typically utilize only a portion 204 of that spectrum for its telephony and data communication services. Spectrum portion 206 is a an exploded view of a portion of spectrum 204. Spectrum portion 206 illustrates the individual RF carriers 208 used by communication system 100. RF carriers 208 are typically spaced 600 KHz apart. Similarly, communication systems 100 typically uses only a portion 210 of RF spectrum 202 for uplink communications. Spectrum portion 212 is an exploded view of a portion of spectrum portion 210. Like spectrum portion 206 in connection with the downlink, spectrum portion 212 illustrates individual RF carriers 214 used in the uplink. It will be relevant to further discussion below, to note that communication system 100 tracks the relative quality of RF carriers 208 and 214, the carrier quality value being used in various methods for assigning communication resources. In this description of the present invention, the word "highest" in connection with carrier quality indicates a better/more desirable carrier, and correspondingly "lower" refers to a less desirable/clean RF carrier. A series of effective methods for tracking carrier quality in such a system are presented in copending U.S. patent application Ser. No. 08/589,842, entitled Channel Quality Management in a Cable Telephony System, filed on Jan. 22, 1996, which is incorporated herein by this reference.

RF carriers 208, 214 can each be illustrated as TDMA channel sequence 216. More specifically, representative RF carrier 216 comprises 8 TDMA divisions 218. As will be recognized by those skilled in the art, each TDMA division or channel 218 can facilitate a separate communication, such as a telephone call. Additionally, each TDMA channel 218 may be further divided into subrate portions 220. Subrate portions 220 are useful when a communication service requires less than the full bandwidth of a TDMA channel 218. Similarly, two or more TDMA channels 218 may be combined when a communication service requires more than the bandwidth available in a single TDMA channel. For example, a simple voice telephone call may require only the bandwidth available in single TDMA channel 218, while a video conference may require 6 TDMA channels 218 combined. This is because much less data would be transmitted for voice only as compared to the video and voice required for video conferencing. As used in this description and discussion, the phrase "communication resource" refers to any portion or combination of the bandwidth available on such an RF carrier 216. For example, communication resource in some cases means a single TDMA channel 218, or combinations of multiple channels 218. Additionally, communication resource may refer to a subrate 220 or combination of subrate divisions 220.

Figure 3:
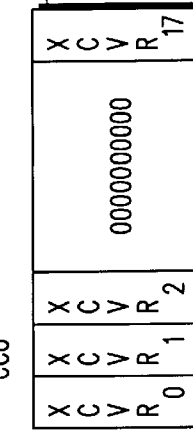
FIG. 3 is a schematic representation of a control unit which is located at the cable company head end of the system of FIG. 1.

Turning now to FIG. 3, FIG. 3 is schematic illustration of the transceivers portion of CCU 106. Among other things, CCU 106 comprises a plurality of transceivers 300. Each transceiver 300 comprises a transmitter and a receiver. Each respective receiver of the transceiver 300 is capable of receiving any of the uplink RF carriers 214 (FIG. 2). Similarly, each of the transmitters of the receivers 300 is capable of transmitting any of the downlink RF carriers 208 (FIG. 2). Furthermore, according to methods consistent with the present invention, any member of the transceivers 300 may be reserved apart from actual service providing, for collecting RF carrier quality information to be used in the various communication resource assignment and allocation methods.

Figure 4:
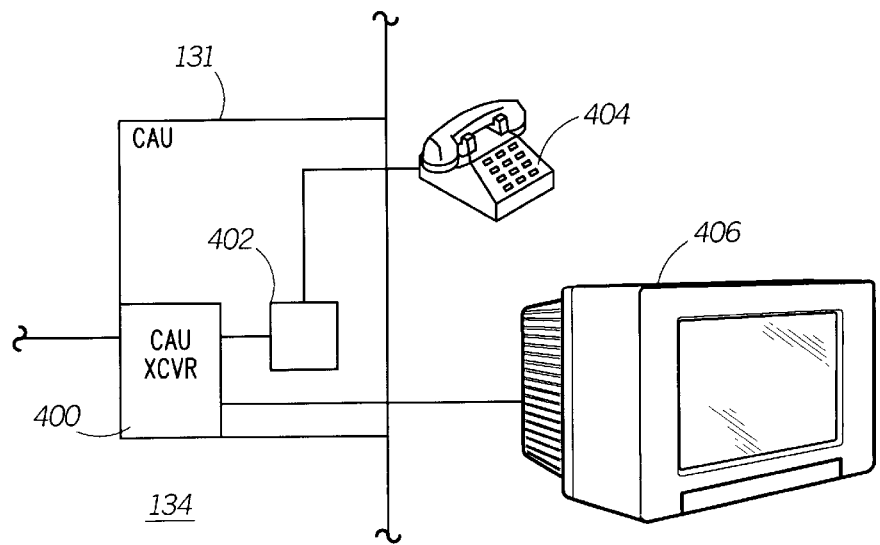
FIG. 4 is a schematic representation of a subscriber unit attached to a single-family home.

Turning to FIG. 4, FIG. 4 is a more detailed schematic illustration of a relatively low service demand subscriber premise 134 of service area 130 shown in FIG. 1. More specifically, subscriber unit 131 (also referred to as cable access unit 131) at subscriber premises 134 is coupled only to Plain Old Telephone (POT) 404 and television 406. Subscriber unit 131 includes subscriber unit transceiver 400 which receives incoming voice data on the various TDMA channels 218 (FIG. 2) and converts it into analog signals to be provided to POT 404. Furthermore, subscriber unit transceiver 400 passes along standard video signals/tv programming to television 406. This detailed view of subscriber premises 134 presented in FIG. 4 is shown to illustrate the types of service demands that will tend to be made at such a subscriber premises. More specifically, subscriber premises 134 places relatively low demands on the communication system 100, in that at any one time premises 134 will require no more than a single voice telephony communication in connection with POT 404 along with standard tv programming in connection with television 406. The premises 134 contrasts from that shown in more detail in FIG. 5.

Figure 5:
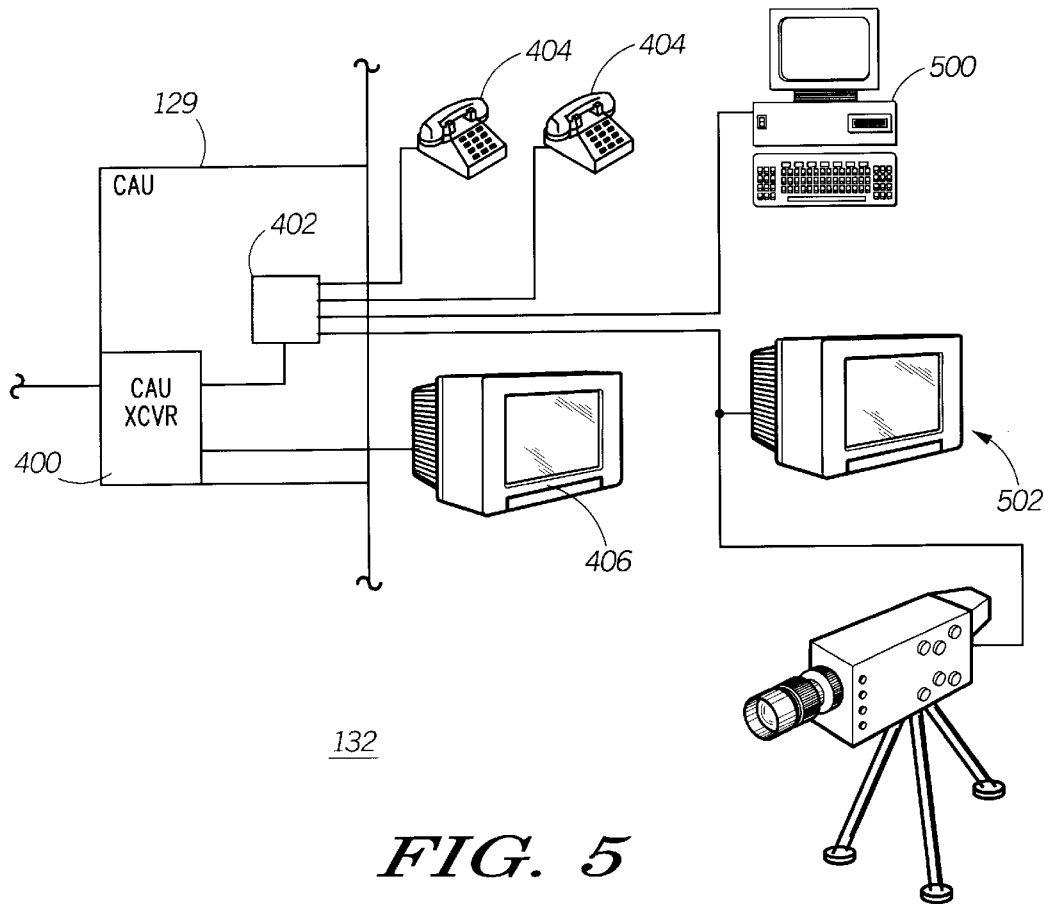
FIG. 5 is a schematic representation of a subscriber unit attached to a subscriber premises having relatively high service demands.

Turning to FIG. 5, FIG. 5 is a more detailed schematic illustration of a relatively high service demand subscriber premise 132 of service area 128 shown in FIG. 1. More specifically, subscriber unit 129 at subscriber premises 132 is coupled to a plurality and large variety of communication devices. The communication devices include POT 404 along with Personal Computer (PC) 500, video conferencing terminal 502 and standard television 406. Consequently, conversion circuitry 402 of subscriber unit 129 must convert digital data received over the HFC network into analog signals appropriate for POT 404, as well as digital signals appropriate for PC 500 and digital and/or analog signals appropriate for video conferencing terminal 502. It is important to note, in connection with the methods of communication resource assignment discussed below, that transceiver 400 of subscriber unit 129 is nevertheless capable of transmitting only a signal uplink RF carrier and receiving only a single downlink RF carrier at any one time. It is the contrast between the nature of subscriber premises 134 and the nature of subscriber premises 132, along with the different sorts of communication services being used, that motivates the methods of communication resource assignment and allocation in accordance with the present invention.

Figure 6:
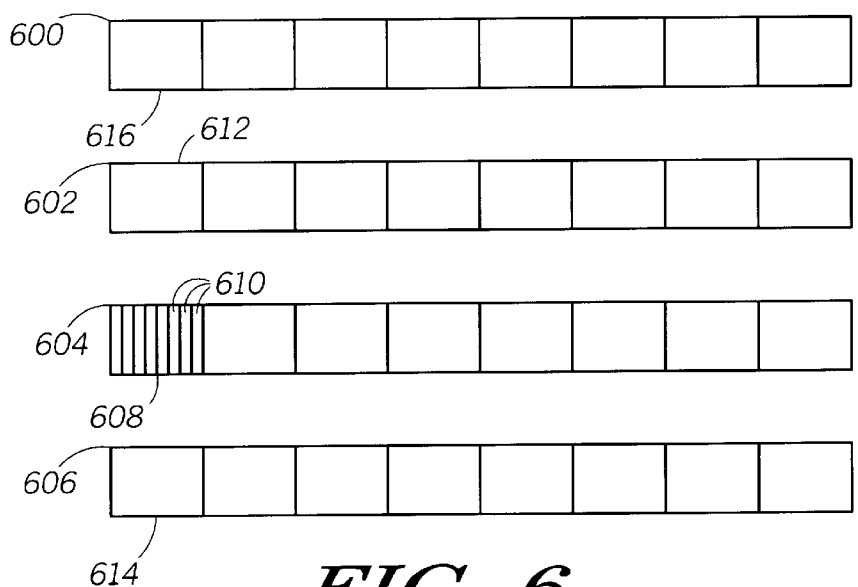
FIG. 6 is a diagram illustrating a plurality of communication resources utilized by the system of FIG. 1.

Briefly, turning to FIG. 6, FIG. 6 illustrates a plurality of RF carriers 600, 602, 604, 606 which are the same in nature as RF carrier 216 of FIG. 2. The plurality of RF carriers 600–606 are illustrated in FIG. 6 in order to facilitate the explanation of methods of allocating communication resources described below.

Figure 7:
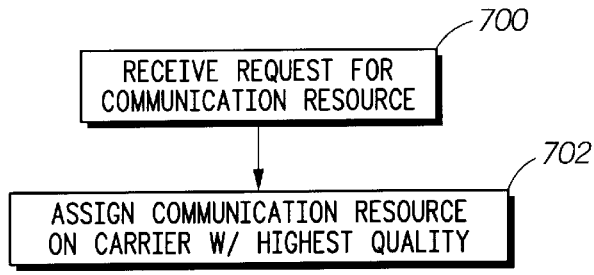
FIGS. 7–10 are flow charts illustrating alternative methods for assigning communication resources.

Turn to FIG. 7, FIG. 7 illustrates a method of assigning and allocating communication resources based purely on carrier quality. The method illustrated in FIG. 7 may be characterized as "Best Quality". Such a method is appropriate for service areas such as service area 130 where each subscriber premises 134 (FIG. 4) will tend to make relatively small service demands (i.e. each premises 134 will demand at most a single voice communication which can typically be accommodated by a single TDMA channel). As illustrated by the flowchart of FIG. 7, this "best quality" method begins with control unit 106 receiving a request for a communication resource at step 700, in the case for example, where a subscriber takes a POT off hook (it will be understood that control unit 106 as used here refers to unit 106 and/or associated system administrating hardware and software). At step 702, the control unit 106 assigns a communication resource to the communication (e.g. the telephone call) which is the RF carrier with the highest carrier quality. Referring to FIG. 6, control unit 106 and associated operating hardware and software will have continually tracked the quality of RF carriers 600–606. As an example, it may be that RF 604 has superior carrier quality (for example, lowest noise) compared to other RF carriers. According to the method illustrated in FIG. 7, then, control unit 106 and associated operating hardware and software will assign communication resource 608 to the communication relating to the recent request. In the example illustrated, communication resource 608 comprises a single TDMA channel. As discussed previously, however, communication resource 608 may alternatively comprise a plurality of TDMA channels, or one or more subrate portions 610.

Figure 8:
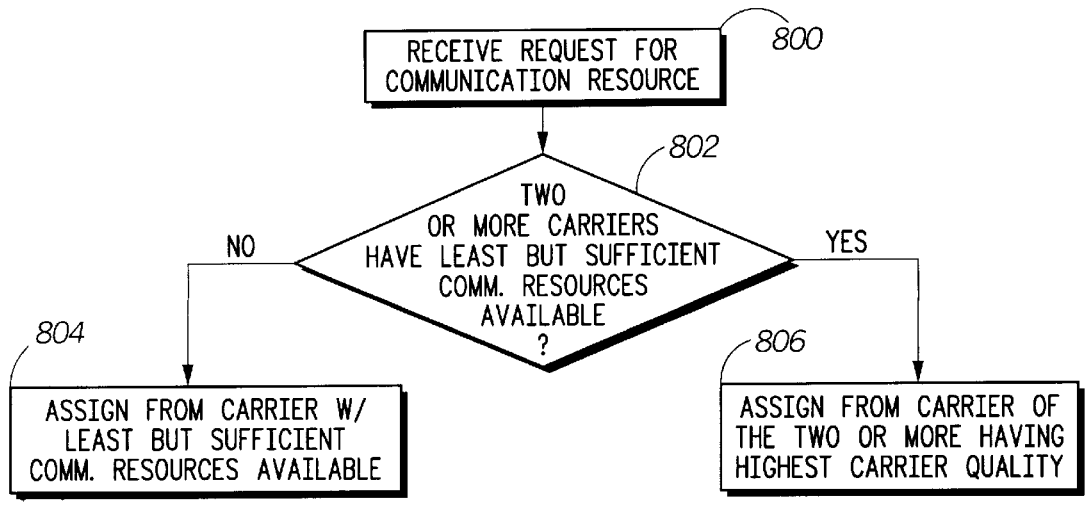

Turning to FIG. 8, FIG. 8 illustrates an alternative method for assigning communication resources. The method illustrated in FIG. 8 may be characterized as "Packed With Best Quality". Generally, this method attempts to assign all communication resources on an RF carrier already in use before assigning communication resources on another RF carrier. Furthermore, according to this method, when presented with a choice between two RF carriers having the same amount of communication resources already occupied, the method assigns communication resources from one of the two having the highest carrier quality. This method of assigning communication resources is particularly efficient and effective in that it conserves transceiver resources 300 of control unit 106 (see FIG. 3). Furthermore, this method is particularly advantageous because it retains as available a relatively large amount of contiguous bandwidth on unused carriers.

Availability of large amounts of contiguous bandwidth on unused carriers is desirable when it is expected that there will be requests for communication resources for high bandwidth services from time to time, such as video conferencing services. For example, a video conference service may require six contiguous TDMA channels. Since the method is illustrated in FIG. 8 attempts to deplete the bandwidth of an entire RF carrier before moving onto the next, there will tend to be many RF carriers having available all eight TDMA channels. Accordingly, as shown in FIG. 8, this method first receives a request for a communication resource at the control unit, at step 800. At step 802, the method determines if there are two or more carriers which have the smallest amount of remaining communication resources available, but sufficient for the particular service relating to the request, for example, one TDMA channel if voice service is requested or six TDMA channels if video conferencing is requested. If a single RF carrier is identified as having the least but sufficient communication resources available, at step 804 the method assigns the requested communication resources from the identified RF carrier. If, on the other hand, the control unit 106 determines that two or more carriers have the same least amount but sufficient communication resources available, then the control unit assigns the communication resources from the one of the two or more RF carriers having the highest carrier quality.

With reference to FIG. 6, the method shown in FIG. 8 would identify which of the RF carriers 600–606 has the least available communication resources, yet sufficient communication resources to provide the service requested. If for example a request for communication resources request three TDMA channels, and RF carrier 600 has only one available, while RF carriers 602 and 604 have three available, and RF carrier 606 has all eight available, then the method shown in FIG. 8 would assign the three TDMA channels from whichever of the RF carriers 602 and 604 have the highest quality.

Figure 9:
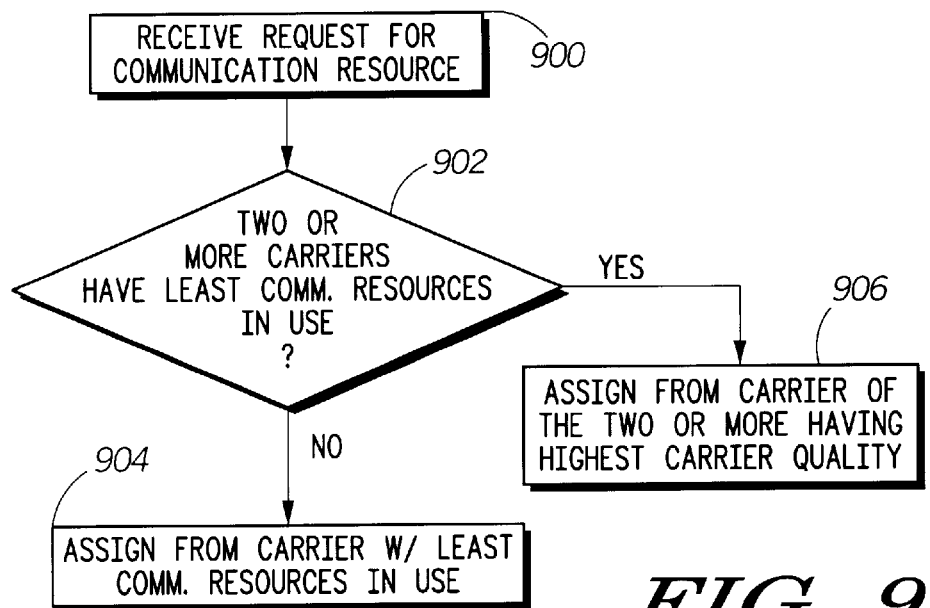

FIG. 9 is a flowchart illustrating another method for assigning communication resources which is particularly advantageous under different circumstances. The method illustrated by FIG. 9 can be characterized as "Distributed With Best Quality". The method illustrated in FIG. 9 tends to evenly distribute communication resource assignment and allocation across the RF carriers. Given two RF carriers having equally the most communication resources available, the method will chose one of the two or more having the highest carrier quality. The Distributed With Best Quality scheme is particularly useful where it is expected that there will be a large demand for bandwidth at any single subscriber premises because individual RF carriers will tend to be dedicated to a single subscriber premises rather than shared by numerous subscriber premises. Consequently, the entire bandwidth available on the particular RF carrier will be available to a particular subscriber premises. The disadvantage of the Distributed With Best Quality scheme is that it does not tend to conserve control unit transceivers 300 (see FIG. 3) because a transceiver 300 must be employed for each RF carrier put to use. Nevertheless, this Distributed With Best Quality method is particularly effective for service areas such as service area 128 having high concentration of subscriber premises in the nature of premises 132 (see FIG. 5). That is, with reference to FIG. 5, it will be apparent that many services, some of relatively high bandwidth, may be demanded simultaneously at such a subscriber premises.

Accordingly, with reference to FIG. 9, the distributed with best quality method for assigning communication resources begins at step 900 by receiving a request at control unit 106 for communication resources. Control unit 106 determines whether two or more RF carriers have the same least number of communication resources in use (step 902). If a single RF carrier is identified as having the least communication resources in use, then at step 904 control unit 106 assigns communication resources from that identified RF carrier. On the other hand, if two or more carriers identified having the same least communication resources in use, then at step 906 the control unit assigns communication resources from the one of the two or more identified RF carriers which has the highest carrier quality.

Referring briefly to FIG. 6 illustration, according to the method shown in FIG. 9, the control unit identifies which of the RF carrier 600–606 had the least communication resources in use. If for example RF carriers 600–604 each have four TDMA channels in use while RF carrier 606 has only two TDMA channels in use, then the requested communication resources are assigned from RF carrier 606.

Figure 10:
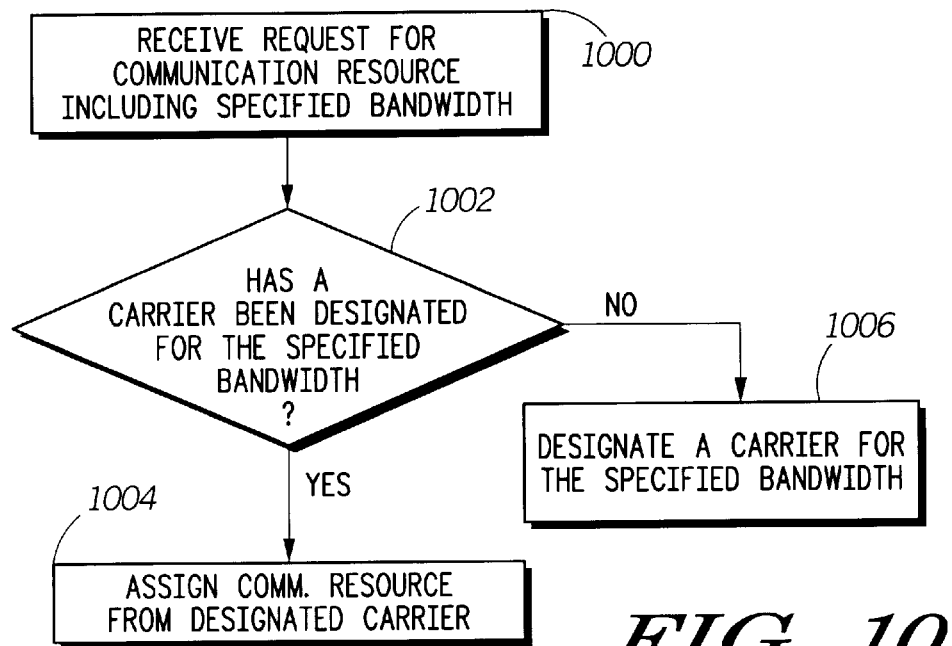

Turning to FIG. 10, FIG. 10 illustrates yet another method for assigning communication resources which may be characterized as "Same Bandwidth Allocation". This method assigns communication resources to one RF carrier based on the amount of communication resources (i.e. bandwidth) requested, tending to assign same bandwidth requests to the same RF carrier. This particular method provides the advantage of reducing "bandwidth fragmentation" because requests for communication resources tend to be for resources in an amount that evenly divides into the entire bandwidth available on an RF carrier. For example, for one type of communication service, a single TDMA channel may be required while for another type of service four TDMA channels may be required. The method illustrated by FIG. 10 tends to assign all of the request for communication resources requiring four TDMA channels to an RF carrier which has already had such a request, and likewise with the request for communication resources needing a single TDMA channel. Consequently, the entire bandwidth of each of the RF carriers will tend to be used. This scheme therefore efficiently uses the transceiver 300 resources available at the control unit. It will be recognized that this scheme is also particularly effective for assigning subrate portions of TDMA channels, because the subrates typically required tend to divide evenly into full TDMA channels.

More specifically, turning to the flowchart of FIG. 10, the Same Bandwidth Allocation method begins at step 1000 by the control unit 106 receiving a request for a communication resource, the request including a bandwidth requirement. At step 1002 the control unit determines whether a particular carrier has been designated for that bandwidth requirement. If a particular RF carrier has been designated for that bandwidth requirement, then the control unit 106 assigns the requested communication resources from that particular RF carrier at step 1004. If, on the other hand no RF carrier has already been designated for that particular bandwidth demand, then control unit 106 designates an RF carrier for that particular bandwidth demand at step 1006, and then proceeds to step 1004 to assign communication resources from the designated RF carrier.

With reference to FIG. 6 for illustration, control unit 106 may receive a request for communication resources including a bandwidth requirement of four TDMA channels. Control unit 106 determines whether any of the RF carrier 600–606 have already been designated for four TDMA channel requests. If for example RF carrier 600 has already been designated for four TDMA channel requests, then control unit 106 assigns the remaining four TDMA channels of RF carrier 600 in connection with the new request. If none of the RF carrier 600–606 have already been designated for four TDMA channel divisions, then control unit 106 designates one of the RF carriers which has four TDMA channels available.

Figure 11:
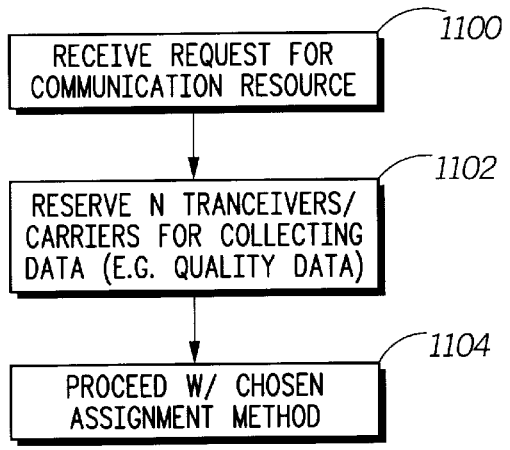
FIG. 11 is a flow chart illustrating an additional step which may augment the methods illustrated in FIGS. 7–10.

FIG. 11 is a flowchart illustrating steps which may augment the various methods of assigning communication resources already described. The steps illustrated in FIG. 11 serve to reserve control unit transceivers 300 to be used for tasks other than carrying on communications, for example for collecting information relating to carrier quality which is used in the various methods already discussed. Accordingly, FIG. 11 begins at step 1100 by receiving a request for communication resources in the same manner as the methods for assigning communication resources already described. However, the added steps in FIG. 11 include step 1102 wherein the control unit 106 reserves a predetermined number of transceivers to be employed for collecting various data including RF carrier quality data. At step 1104, control unit 106 proceeds with one of the preferred methods of assigning communication resources which has already been described.

Figure 12:
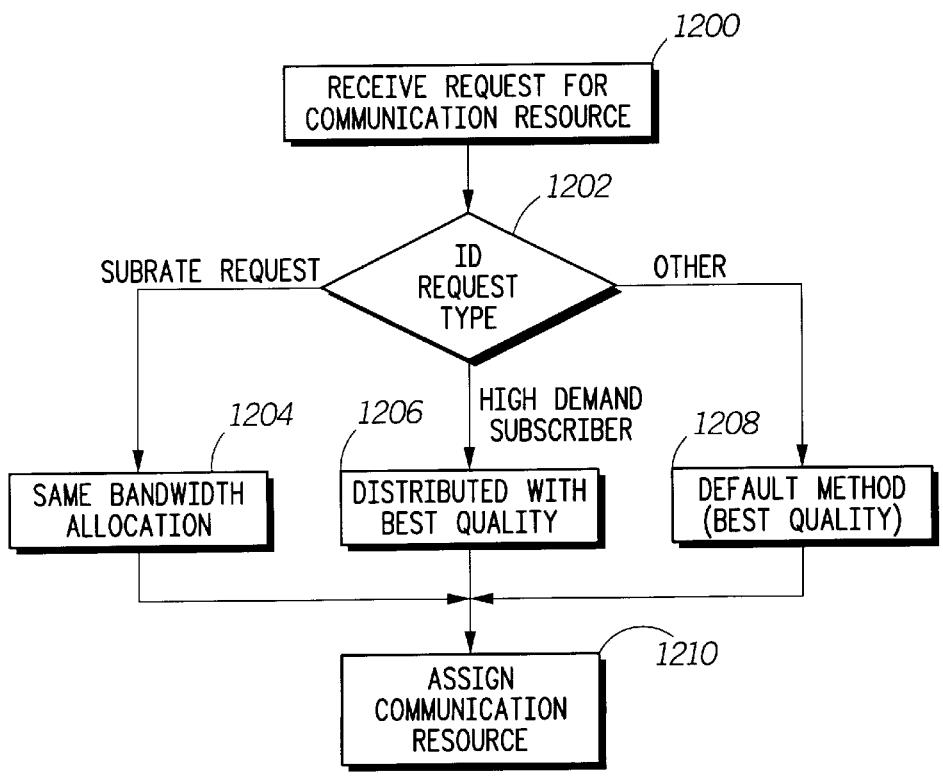
FIG. 12 is a flow chart illustrating a flexible method for choosing between a variety of communication resource assignment methods.
Figure 13:
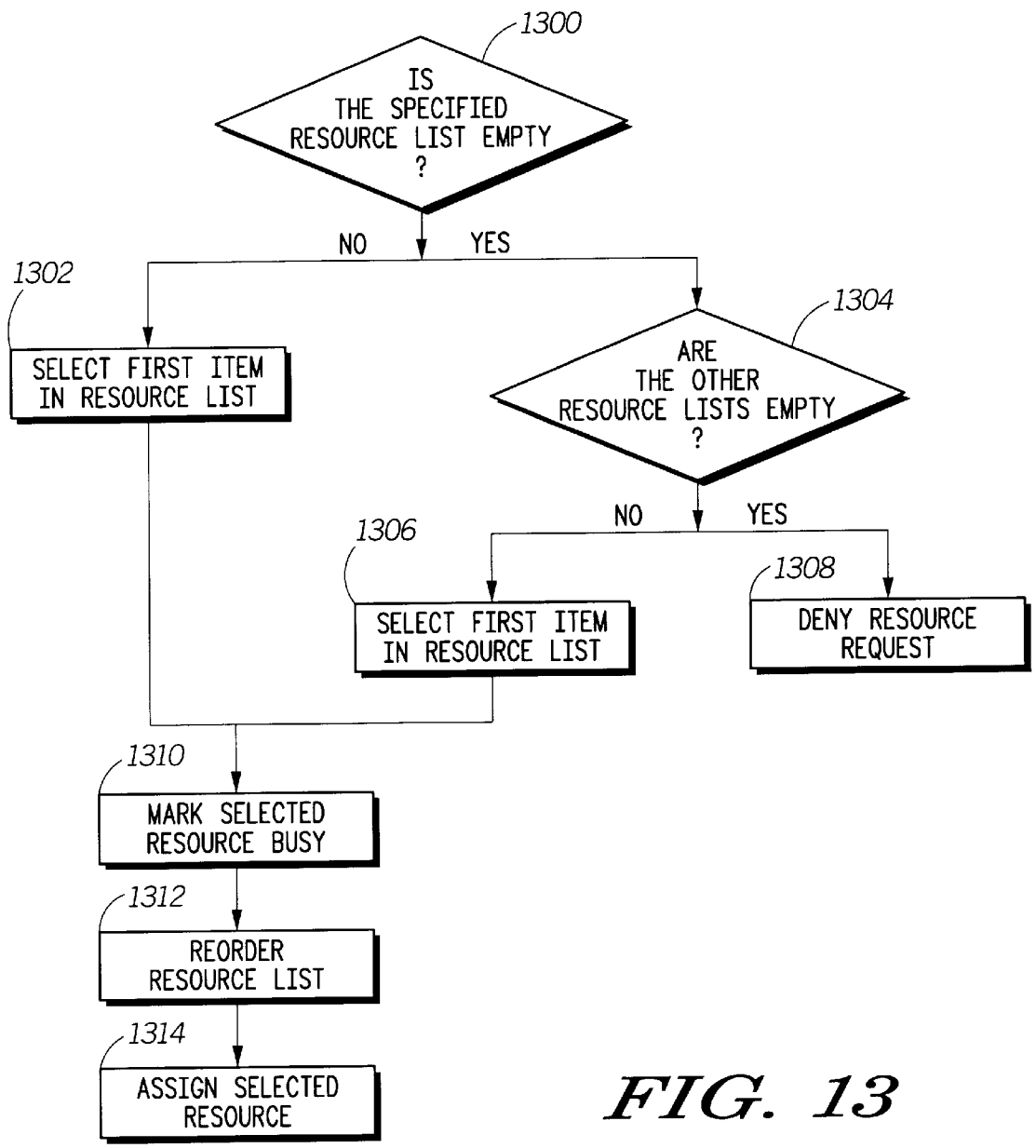
FIG. 13 is flow chart illustrating a plurality of steps which may augment the method illustrated in FIG. 12.

FIGS. 12 and 13 illustrate how the various preferred methods of assigning communication resources which have already been described may be used on combination in connection with a diverse RF communication network such a communication system 100. That is, communication system 100 services a variety of serving areas which vary drastically with respect to service type and quantity demand, for example service area 130 compared to service area 128. Consequently, it is desirable to employ a combination of the inventive methods of assigning communication resources described above when servicing such a diverse network.

FIG. 12 illustrates how Same Bandwidth Allocation, Distributed With Best Quality and a default method such as Best Quality may be used together to most effectively service the network. It has been recognized that Same Bandwidth Allocation is particularly effective for subrate communications. Furthermore, as explained above, it has been recognized that Distributed With Best Quality is particularly effective for requests from subscriber units (Cable Access Units or CAUs) serving many premises equipment devices, such as unit 129 in FIG. 5.

Consequently, according to FIG. 12, when the control unit 106 receives a request for a communication resource (step 1200), the control unit 106 identifies the type of request (step 1202), i.e. a subrate request, a request from a high demand subscriber, or other. If the request is for a subrate, Same Bandwidth Allocation is employed (step 1204). If the request is from a high demand subscriber (or service area dense with high demand subscribers) then Distributed With Best Quality is employed (step 1206). Any other type of request defaults to resource assignment by the Best Quality Method (step 1208). Whichever assignment method is employed, the communication resource is assigned at step 1210.

FIG. 13 is a flow chart illustrating the concept that for each different resource allocation scheme that is supported (e.g. FIG. 12), there may be a dedicated pool (i.e. list ordered according to the applicable scheme) of associated resources. For example, the eight TDMA channels 218 (see FIG. 2) of a predetermined number of RF carriers 208,214 (see FIG. 2) may be reserved for use by each allocation method. Referring to FIG. 13, a method consistent with present invention may begin at step 1300 by determining if the resource list associated with the particular allocation scheme being called on is empty. If it is not empty, than the method selects and the first available communication resource according to that allocation scheme (step 1302). If the resource list associated with allocation scheme being called on is empty, than the method falls back on another resource list associated with a different scheme because this is preferable to denying resources all together. Accordingly, at step 1304 the method determines whether there are resources available from a list associated with a different scheme. If there are, then the first available item is selected from that list which has been ordered according to the alternate allocation scheme (step 1306). If, on the hand, all resource lists are empty, then the method denies the resource request at step 1308.

If a communication resource has been selected either at step 1302 or step 1306, then those resources are marked as "busy" on the associated list (step 1310). Subsequently, the associated list is reordered according to the applicable allocation scheme (step 1312). Finally, the selected communication resources are actually assigned to the communication (step 1314).

It will be understood that what has been described above are a variety of preferred variations consistent with the present invention. Nevertheless, it should also be understood that the present invention should not be taken to be limited in any way to the particular methods or apparatus discussed, or as needing to include every aspect shown. Rather, the scope of the invention is defined solely by the accompanying claims.

What is claimed is:

1. A method for assigning communication resources in a communication system comprising the steps of:

providing a plurality of radio frequency carriers, each comprising a plurality of communication resources, the radio frequency carriers each having a carrier quality;

receiving a request at a control unit for a first one of the communication resources;

assigning one of the plurality of communication resources of one of the plurality of radio frequency carriers having fewest of its communication resources already in use; and establishing a communication between an originating terminal and a subscriber unit, the subscriber unit coupled to a plurality of communication devices, wherein a first one of the communication devices comprises a Plain Old Telephone (POT) and a second one of the communication devices comprises a video conference terminal.

2. The method of claim 1, wherein the step of assigning further comprises, in response to at least two of the plurality of radio frequency carriers having a same number of communication resources already in use, assigning one of the at least two of the plurality of radio frequency carriers having a highest carrier quality.

3. The method of claim 1, wherein the control unit comprises a plurality of receivers and further including the step of reserving at least one of the plurality of receivers and employing the one of the plurality of receivers to collect carrier quality information.

4. The method of claim 1, further comprising the step of establishing a communication between an originating terminal and a subscriber unit, the subscriber unit coupled to a plurality of communication devices.

5. A method for assigning communication resources in a communication system comprising the steps of:

providing a plurality of radio frequency carriers, each comprising a plurality of communication resources, the radio frequency carriers each having a carrier quality;

receiving a request at a control unit for a first one of the communication resources; and assigning one of the plurality of communication resources of one of the plurality of radio frequency carriers having fewest of its communication resources alreadyin use, wherein each of the plurality of radio frequency carriers comprises a plurality of Time Division Multiple Access (TDMA) divisions and wherein the step of receiving comprises receiving a request for one of the plurality of communication resources which is smaller than one of the TDMA divisions.

6. A method for assigning communication resources in a communication system comprising the steps of:

providing a plurality of radio frequency carriers, each comprising aplurality of communication resources, the radio frequency carriers each having a carrier quality;

receiving a request at a control unit for a first one of the communication resources; and assigning one of the plurality of communication resources of one of the plurality of radio frequency carriers having fewest of its communication resources already in use;

wherein each of the plurality of radio frequency carriers comprises a plurality of Time Division Multiple Access (TDMA) divisions and wherein the step of receiving comprises receiving a request for one of the plurality of communication resources which is larger than one of the TDMA divisions.

* * * * *